(12) United States Patent
Rambosek (10) Patent No.: US 6,480,357 B1
(45) Date of Patent: Nov. 12, 2002

(54) DATA STORAGE CARTRIDGE HAVING A WEAR PAD FOR A BRAKE BUTTON

(75) Inventor: G. Phillip Rambosek, Schafer, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/575,326

(22) Filed: May 19, 2000

(51) Int. Cl.⁷ .............................................. G11B 23/02
(52) U.S. Cl. ...................................................... 360/132
(58) Field of Search ....................... 360/132; 242/338.1, 242/343, 343.1

(56) References Cited

U.S. PATENT DOCUMENTS

| | | | |
|---|---|---|---|
| 3,857,531 A | 12/1974 | Jantzen | 242/342 |
| 5,027,249 A | 6/1991 | Johnson et al. | 242/345.2 |
| 5,297,755 A | 3/1994 | Felde et al. | 242/346 |
| 5,400,981 A | 3/1995 | Rambosek et al. | 242/348 |
| 5,564,647 A | 10/1996 | Bay et al. | 242/608.8 |
| 5,901,916 A | * 5/1999 | McAllister et al. | 242/348 |

FOREIGN PATENT DOCUMENTS

| | | |
|---|---|---|
| EP | 0 588 219 B1 | 11/1998 |
| EP | 0 926 676 A1 | 6/1999 |

* cited by examiner

Primary Examiner—David Davis
(74) Attorney, Agent, or Firm—Eric D. Levinson (57) ABSTRACT

A data storage tape cartridge has a housing (12) and a tape reel assembly (14) rotatably mounted in the housing (12). An unlocking member (170) is constructed from a filled thermoplastic and a wear member (185) is operatively connected to the unlocking member (170) forming a wear surface.

9 Claims, 10 Drawing Sheets

DATA STORAGE CARTRIDGE HAVING A WEAR PAD FOR A BRAKE BUTTON

BACKGROUND OF THE INVENTION

This invention relates generally to a data storage tape cartridge and more particularly to a data storage tape cartridge having a wear pad for use in conjunction with a brake button.

Cartridges have been used for decades in the computer, audio and video fields. The data storage tape cartridge continues to be an extremely popular form of recording large volumes of information for subsequent retrieval and use. Improvements to the data cartridges have lead, in some instances, to more compact and thinner data cartridges being used, such as that shown in my copending application, U.S. application Ser. No. 09/408,601, entitled "Three-Piece Tape Reel Assembly a Data Storage Tape Cartridge." With the earlier versions of drives and cartridges that were taller and thicker, there was a greater throw distance in the drive available for when the drive chuck engaged the data cartridge. While the improved cartridges have lead to thinner cartridges, along with other advantages, there has always been a concern for wear on the components of the data cartridge when the drive chuck has engaged the cartridge and the tape reel is rotating.

Data storage tape cartridges are important tools to maintain vast amounts of information. To remain competitive, data storage tape cartridge manufacturers must continually improve cartridge performance and reliability while reducing manufacturing costs. Therefore, the need exists to manufacture a data storage cartridge which is effective and provides for increased wear characteristics between the components of the data storage cartridge while the tape reel is rotating where applicable.

SUMMARY OF THE INVENTION

In one embodiment, the invention is a data storage cartridge having a housing defining an enclosure. A tape reel assembly is rotatably mounted in the housing. A brake member is operatively connected to the housing. An unlocking member is operatively connected to the tape reel assembly and movable between a locked position and an unlocked position, wherein when in the unlocked position, the unlocking member moves the brake member away from the tape reel, thereby allowing the tape reel to rotate. The unlocking member is constructed from a filled polycarbonate. A wear member is operatively connected to the unlocking member forming a wear surface at a position which contacts the brake member when in the unlocked position. In a preferred embodiment, the unlocking member is formed from a glass filled polycarbonate and the wear member is a polyethylene film.

In another embodiment, the invention is a data storage cartridge having a housing defining an enclosure. A tape reel assembly is rotatably mounted in the housing. A brake member is operatively connected to the housing. An unlocking member is operatively connected to the tape reel assembly and movable between a locked position and an unlocked position, wherein when in the unlocked position, the unlocking member moves the brake member away from the tape reel, thereby allowing the tape reel to rotate. The unlocking member is constructed from a filled polycarbonate. A wear member is operatively connected to the unlocking member forming a wear surface at a position which contact the brake member when in the unlocked position. In a preferred embodiment, the unlocking member is constructed from a glass filled polycarbonate and the wear member is a polyethylene film attached to the unlocking member with an adhesive.

DETAILED DESCRIPTION OF THE PREFERRED EMBODIMENT

Figure 1:
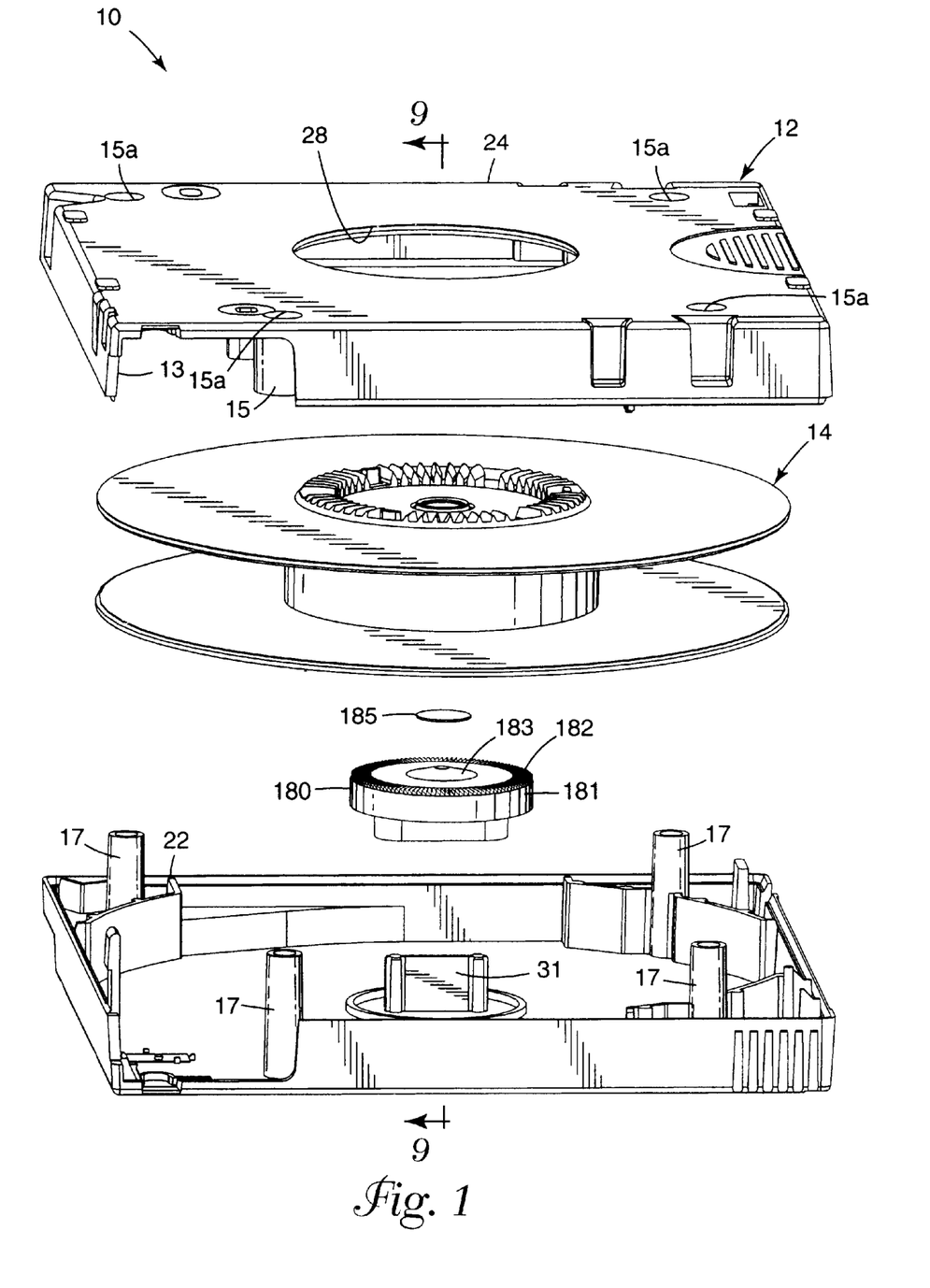
FIG. 1 is an exploded perspective view of a data storage tape cartridge in accordance with the present invention.

One preferred embodiment of a data storage tape cartridge 10 is shown in FIG. 1. Generally speaking, the data storage tape cartridge 10 includes a housing 12, a tape reel assembly 14 and a storage tape (not shown). The tape reel assembly 14 is disposed within the housing 12. The storage tape is in turn wound around the tape reel assembly 14 and includes a free end which may be secured to a leader pin (not shown) which is positioned near an opening 13, which is well known in the art.

The housing 12 is preferably sized to be received by a typical tape drive (not shown). Thus, the housing 12 may be sized for use within a 5.25 inch (130 millimeter) form factor drive, a 3.5 inch (90 millimeter) form factor drive or other useful sizes. With this in mind, the housing 12 is defined by a first housing section 22 and a second housing section 24. In one preferred embodiment, the first housing section 22 forms a cover, whereas the second housing section 24 serves as a base. It should be understood that directional terminology, such as "cover", "base", "upper", "lower", "top", "bottom", etc. are used for purposes of illustration only and are in no way limiting.

The first and second housings 22, 24 are configured to be reciprocally mated to one another and are generally rectangular. The opening 13 serves as an opening for the storage tape to exit the housing 12 such that the storage tape can be threaded to a tape drive (not shown). The second housing section 24 further forms a central opening 28 which facilitates access to the tape reel assembly 14 by a drive chuck portion of a tape drive (not shown). The storage tape is preferably a magnetic tape of a type commonly known in the art. For example, the tape may consist of a balanced polyethylene napththalate (PEN) based material coated on one side with a layer of magnetic material dispersed within a suitable binder system, and on the other side a conductive material dispersed in a suitable binder system. Acceptable magnetic tape is available, for example, from Imation Corp. of St. Paul, Minn. The housings 22, 24 are secured by means well known in the art. This may include screws (not shown) which are inserted through holes 15a formed in hollow cylinders 15. Posts 17 fit inside cylinders 15 and the screws are inserted into the posts 17 and thereby secure the sections 22, 24 to each other.

Shown in FIGS. 2 through 6 is the tape reel assembly 14, shown without the locking member 170. As described in greater detail below, each of the upper flange 40, the lower flange 42 and the hub ring 44 are separately manufactured and subsequently assembled such that the hub ring 44 is secured between the upper flange 40 and the lower flange 42.

Figure 2:
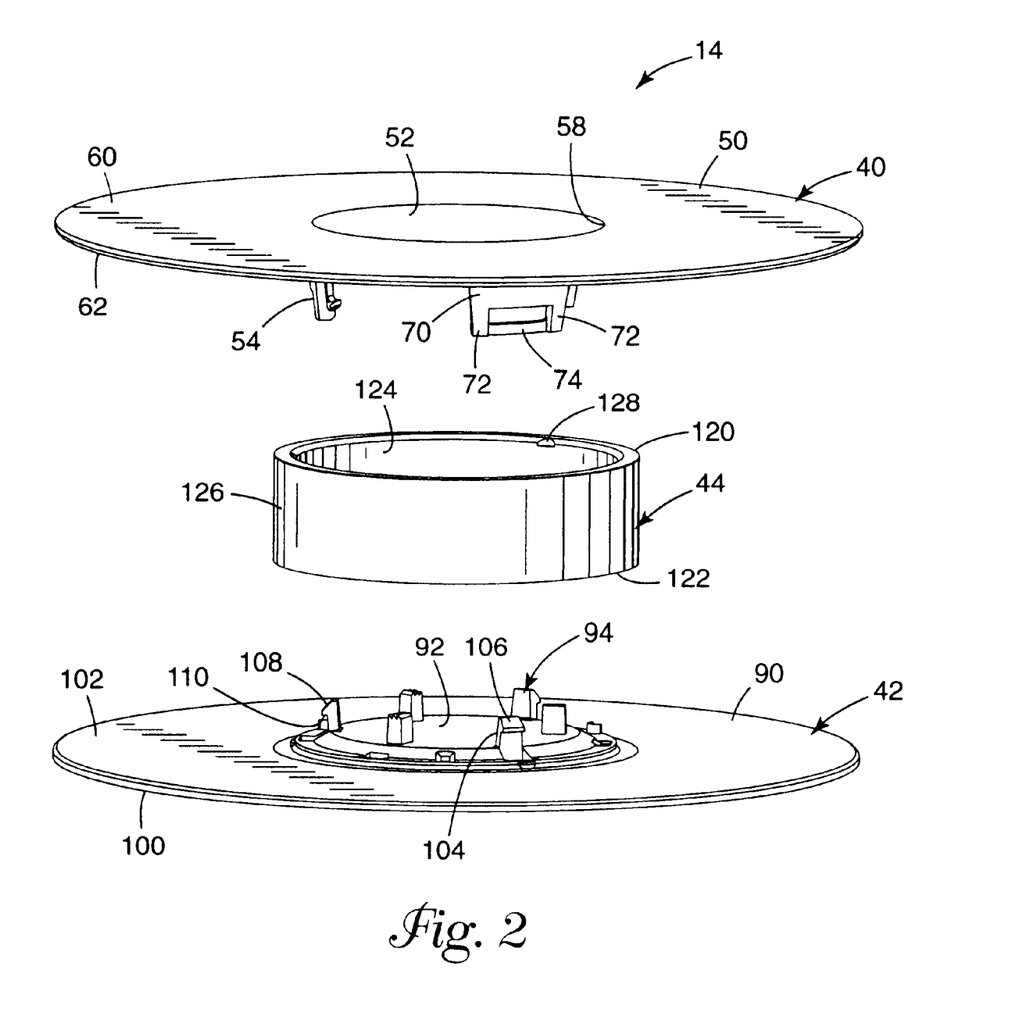
FIG. 2 is an exploded view of a tape reel assembly of the data storage cartridge of FIG. 1.
Figure 3:
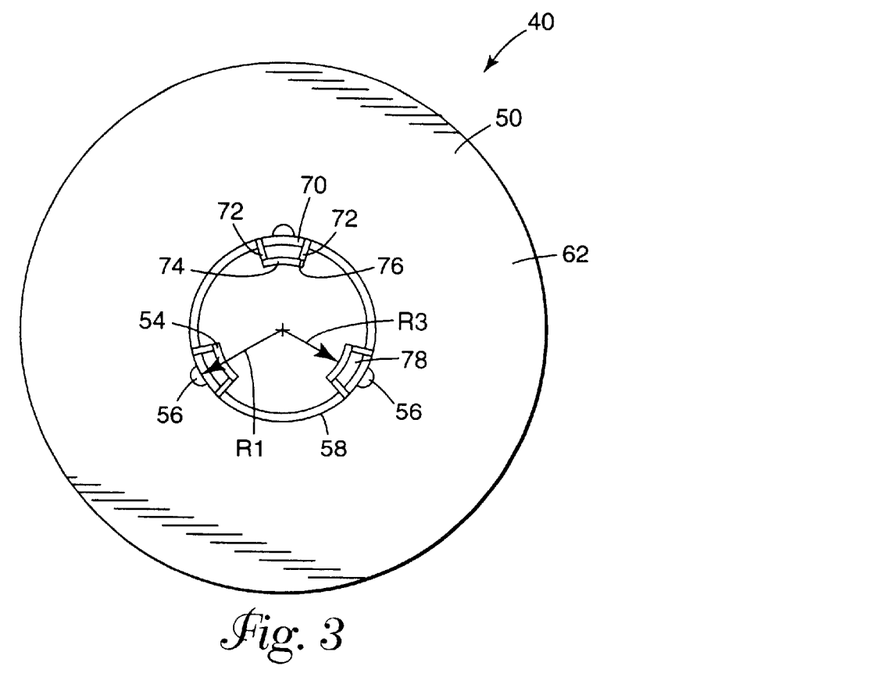
FIG. 3 is a bottom view of an upper flange of the tape reel assembly of FIG. 2.

With reference to FIGS. 2 and 3, the upper flange 40 includes a top plate 50, a rim 52, loop members 54 and anti-rotation bosses 56. In one preferred embodiment, the top plate 50, the rim 52, and loop members 54 and the finger bosses 56 are integrally formed as part of a molding process, with the rim 52, the loop members 54 and the bosses 56 extending from the top plate 50.

The circular top plate 50 is preferably circular and forms a central passage 58. Further, the top plate 50 defines an outer face 60 and an inner face 62 (shown best in FIG. 3). In a preferred embodiment, the top plate 50 is highly flat, having a flatness of less than 0.004 inch warp or axial run-out. Further, the top plate 50 is preferably sized in accordance with a desired data storage tape cartridge 10 (FIG. 1) configuration. Thus, in one preferred embodiment, the top plate 50 has a diameter of approximately 97 millimeters, although other dimensions are equally acceptable.

The rim 52 is formed about the central passage 58, extending in a generally axial fashion from the inner face 62. In one preferred embodiment, the rim 52 is circular in shape to facilitate placement of the hub ring 44 and has an inner diameter of approximately 35 millimeters and an axial extension of approximately 4 millimeters. It should be recognized, however, that any other dimensions, either greater or smaller, may be employed.

The loop members 54 extend in a generally axial fashion from the rim 52 (away from the inner face of the top plate 50). In one preferred embodiment, three of the loop members 54 are provided, with the loop members 54 being equidistantly spaced about a circumference defined by the rim 52. Alternatively, a greater or lesser number of the loop members 54 may be provided. Regardless, each of the loop members 54 extend from the rim 52 at a radius R1 (relative to a center of the top plate 50). As will be described in greater detail below, the radius R1 bears a known relationship to a radius defined by the hub ring 44 (FIG. 2) such that each of the loop members 54 can project within an inner area of the hub ring 44 upon final assembly. Regardless of exact location, each of the loop members 54 are configured to be flexible or deflectable relative to the top plate 50. This preferred characteristic can be achieved via material selection, forming the loop members 54 to be relatively thin, or a combination thereof By forming the loop members 54 to be flexible or deflectable, a stress placed upon the loop members 54, this stress will not, in large part, be transferred to the top plate 50.

In one preferred embodiment, each of the loop members 54 includes a base portion 70, opposing arms 72 and a cross-member 74. The base portion 70 is arcuate in shape, corresponding with the circle defined by the rim 52. Thus, the base portion 70 is located at the radius R1, having a preferred arc length of approximately 13 millimeters. The opposing arms 72 extend from the base portion 70 in a generally axial fashion, each having an extension length of approximately 4 millimeters. In one preferred embodiment, each of the opposing arms 72 are biased or oriented to extend slightly inwardly relative to a central axis of the top plate 50. With the orientation in mind, each of the opposing arms 72 defines an inside surface 76. Finally, the cross-member 74 extends across the opposing arms 72, and is spaced from the base portion 70 so as to define an open engagement area 78. As best shown in FIG. 3, in one preferred embodiment, the cross-member 74 is arcuate in shape, extending between the inside surfaces 76 of the opposing arms 72. Thus, the cross-member 74 defines a radius R3 that is slightly smaller than the radius R1 defined by the base portion 70. Effectively then, the cross-member 74 of each of the loop members 54 is located radially inwardly relative to the rim 52 and thus the central passage 58. The above-described configuration of the loop members 54 preferably renders each of the loop members 54 slightly compliant. Thus, each loop member 54 can deflect slightly to accommodate any tolerance deviations that occur during manufacture, thereby avoiding a transfer of stress to the top plate 50. Notably, while each loop member 54 has been described as including the base portion 70, this feature can be eliminated such that the opposing arms 72 extend directly from the rim 52. Even further, the rim 52 may be omitted, whereby the loop members 54 extend directly from the inner face 62 of the top plate 50.

Finally, the bosses 56 are located along the inner face 62 of the top plate 50. In one preferred embodiment, the upper flange 40 includes three of the bosses 56, with each of the bosses 56 being formed adjacent a respective one of the loop members 54 and thus equidistantly spaced. Alternatively, however, any other number and alternative locations may be employed. Each of the bosses 56 is preferably a semi-circle, extending radially outwardly from the rim 52. As described below, this configuration facilitates engagement of the bosses 56 with a portion of the hub ring 44.

The upper flange 40 is preferably integrally formed as part of a molding process. In one preferred embodiment, the upper flange 40 is molded from a strong, relatively pliable polymer, such as polycarbonate. Alternatively, other rigid yet pliable materials can be employed. The preferred pliable attribute imparts the desired flexibility to the loop members 54. Further, the molding process renders the top plate 50 highly flat.

Figure 4:
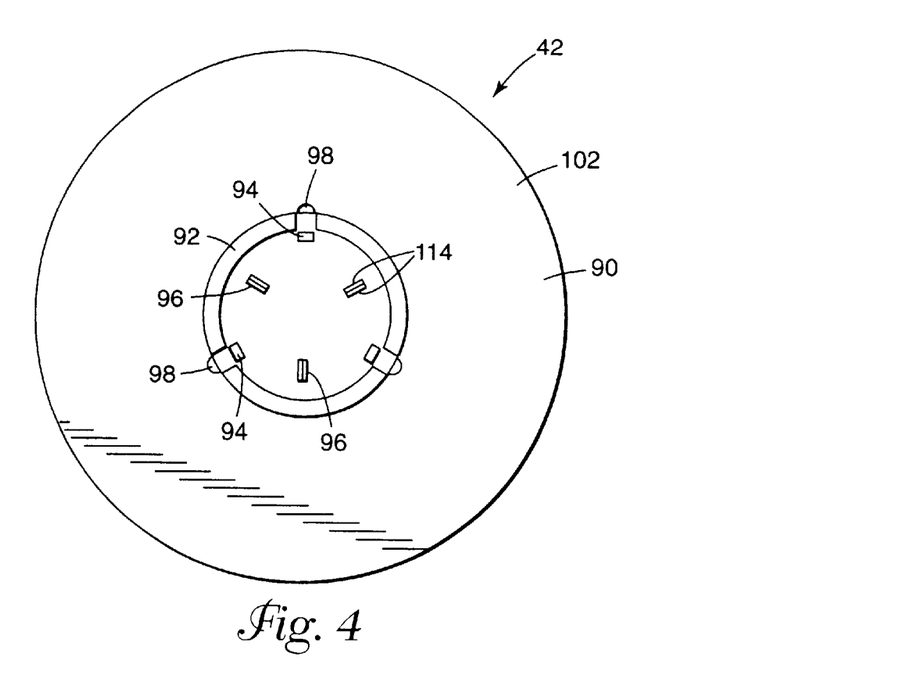
FIG. 4 is a top plan view of the lower flange of the tape reel assembly of FIG. 2.

With references to FIGS. 2 and 4, the lower flange 42 includes a bottom plate 90, a shoulder 92, legs 94, toothed sections 96 and anti-rotation bosses 98. In a preferred embodiment, the lower flange 42 is integrally formed with the shoulder 92, the legs 94, the toothed sections 96 and the bosses 98 extending from the bottom plate 90.

The bottom plate 90 is preferably circular, corresponding in diameter with the top plate 50 (FIG. 3). Thus, in one preferred embodiment, the bottom plate 90 has a diameter of approximately 97 millimeters. Similarly, the bottom plate 90 is preferably highly flat, having a flatness of less than 0.004 inch warp or axial run-out. Finally, the bottom plate 90 defines an outer face 100 and an inner face 102.

The shoulder 92 is preferably circular in shape, extending in an axial fashion from the inner face 102 of the bottom plate 90. In one preferred embodiment, an outer circumference of the shoulder 92 serves as a guide surface for assembly of the hub ring 44.

The legs 94 extend in a generally axial fashion from the shoulder 92. As shown in FIG. 4, one preferred embodiment, three of the legs 94 are provided. Alternatively, however, any other number, either greater or smaller, is equally acceptable, so long as the number of the legs 94 corresponds with the number of loop members 54. The legs 94 are positioned relative to a center of the bottom plate 90 so to engage a respective one of the loop members 54 upon final assembly. Thus, the legs 94 are preferably equidistantly spaced, positioned along a circumference of the shoulder 92 at approximately the same radius (R1) as the loop members 54. Further, as best shown in FIG. 2, each of the legs 94 preferably includes a shank 104 and a head 106. The head 106 preferably forms an angled surface 108, and an over-hang 110. The angled surface 108 is configured to facilitate sliding engagement with the respective loop member 54, whereas the over-hang 110 is configured to engage the cross-member 74 in a snap-fitting relationship. In one preferred embodiment, the shank 104 extends from the shoulder 92 in a slightly angular fashion, such that the leg 94 is biased radially outwardly. This outward bias functions in conjunction with the previously described inward bias of the loop members 54 to facilitate a secure fit between the two components upon final assembly.

The toothed sections 96 extend axially from the shoulder 92 and form teeth 114. In one preferred embodiment, three equidistantly spaced toothed sections 96 are provided. Alternatively, any other number, either greater or smaller, may be employed. Regardless, the toothed sections 96 are located at a radius relative to a center of the bottom plate 90 that is less than a radius of the central passage 58 to the top plate 50. With this configuration, upon final assembly, the toothed sections 96, and in particular the teeth 114, may be accessed through the central passage 58 by a braking mechanism (to be described in more detail hereafter). Notably, sufficient braking can be achieved by forming two or three teeth 114 at each of the toothed sections 96. Alternatively, a greater number of the teeth 114 can be provided.

Finally, the bosses 98 are located along the inner face 102 of the bottom plate 90. In one preferred embodiment, the lower flange 42 includes three of the bosses 98, each being formed adjacent a respective one of the legs 94 and thus equidistantly spaced. Other numbers and/or locations may be utilized. Each of the bosses 98 is preferably a semi-circle, extending radially outwardly from the shoulder 92. As described below, this configuration facilitates engagement of the bosses 98 with a portion of the hub ring 44.

The lower flange 42 is preferably integrally formed during a molding process. In one preferred embodiment, the lower flange 42 is molded from a relatively rigid plastic material selected to provide enhanced wear characteristics. For example, the lower flange 42 can be molded from 20 percent glass filled polycarbonate, although a wide variety of other relatively rigid materials can alternatively be employed. Further, the molding process renders the bottom plate 90 highly flat. It should be understood that while the lower flange 42 preferably includes the shoulder 92, the shoulder 92 can be eliminated such that the legs 94 and the toothed sections 96 extend directly from the inner ace 102 of the bottom plate 90.

With reference to FIG. 2, the hub ring 44 is preferably a cylindrical ring defining a top end 120, a bottom end 122, an inner surface 124 and an outer winding surface 126. The outer winding surface 126 is preferably highly cylindrical or round for optimal engagement with the storage tape. Further, one preferred embodiment, the hub ring 44 forms upper notches 128 extending in a generally radial fashion from the inner surface 124 at the top end 120. The upper notches 128 are preferably sized and positioned to correspond with the bosses 56 (FIG. 3) formed in the upper flange 40. Similarly, although hidden in FIG. 2, the hub ring 44 preferably forms lower notches extending in a radial fashion from the inner surface 124 at the bottom end 122. These lower notches are preferably configured and positioned to engage the bosses 98 (FIG. 4) associated with the lower flange 42.

Figure 5A:
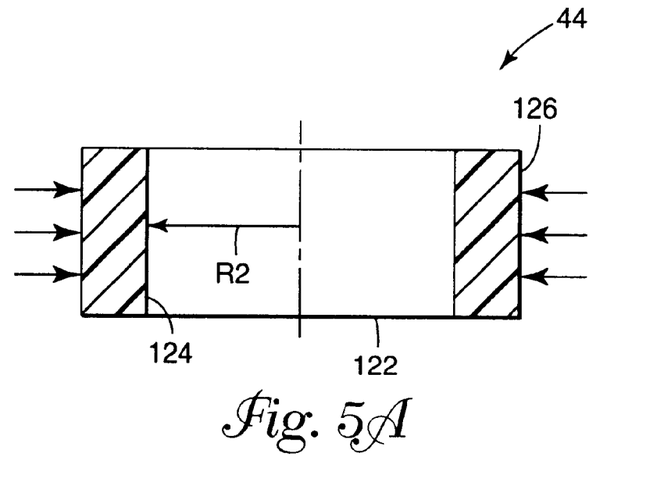
FIG. 5A is a cross-sectional view of a hub ring in accordance with the present invention.
Figure 5B:
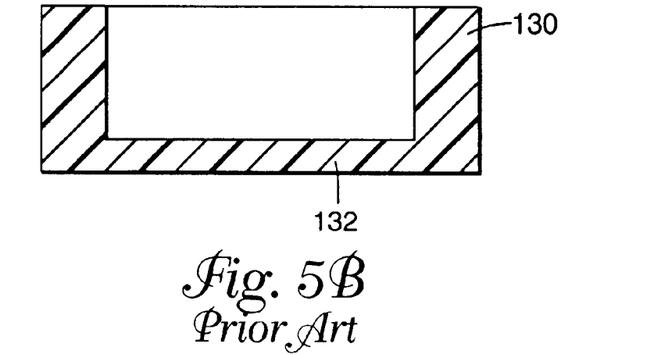
FIG. 5B is a cross-sectional view of a prior art hub.

With reference to FIGS. 2 and 5A, the hub ring 44 is preferably configured such that the hub ring 44 is free of material extending across an inner diameter defined by the inner surface 124. That is to say, unlike prior art tape reel assemblies, the hub ring 44 does not include a web of material or similar structure extending across the inner surface 124. Instead, the hub ring 44 is simply a ring-shaped body. To achieve a highly rounded outer surface 126, the hub ring 44 is preferably molded from a plastic material such as 10 percent glass filled polycarbonate, although a wide variety of other material are equally useful.

In addition to being free of material extending across an inner diameter thereof, the hub ring 44 is preferably symmetrical in transverse cross-section, as best shown in FIG. 5A. During use, the storage tape is tightly wound about the outer winding surface 126 of the hub ring 44. As a result, the storage tape will exert a force or stress across the hub ring 44 (represented by arrows in FIG. 5A). The symmetrical configuration of the hub ring 44 facilitates a uniform distribution of force across the hub ring 44. Further, it may be desirable for the hub ring 44 to collapse slightly in response to this force, such as with environmental temperature changes. To this end, the symmetrical configuration of the hub ring 44 allows the hub ring 44 to preferably collapse uniformly. This desired uniform collapse is in contrast to prior art hub configurations as shown, for example, in FIG. 5B. The prior art hub includes a hub ring 130 and a web of material 132 extending across a lower portion thereof The web of material 132 essentially reinforces the lower portion of hub ring 130 such that the hub ring 130 will collapse non-uniformly, with a majority of the collapse occurring at an upper portion of the hub ring 130. In contrast, the hub ring 44 (FIG. 5A) of the present invention uniformly distributes stress, and therefore collapses uniformly.

Figure 5C:
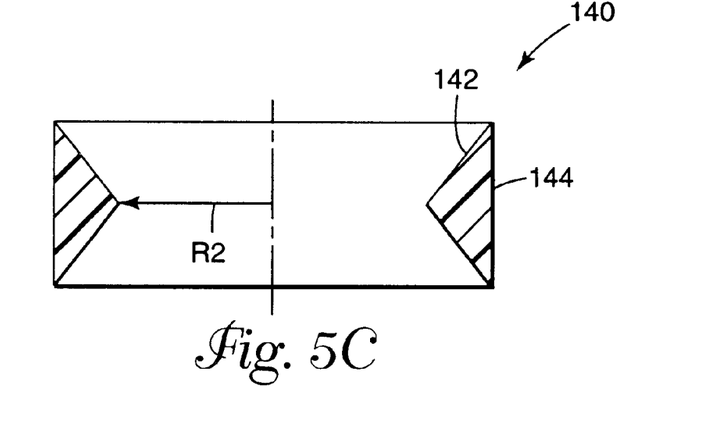
FIG. 5C is a cross-sectional view of an alternative hub ring in accordance with the present invention.

Finally, the inner surface 124 of the hub ring 44 is preferably linear in cross-section, defining a radius R2. The radius R2 is configured to allow passage of the loop members 54 (FIG. 2) and the legs 94 (FIG. 2) upon final assembly. As a result, the radius R2 is greater than radius R1 defined by the loop members 54. Thus, an inner area of the hub ring 44 (defined by the inner surface 124) is sufficiently sized for projection of, and interaction between, the loop members 54 and the legs 94, respectively. Alternatively, other symmetrical configurations are acceptable. To this end, an alternative embodiment hub ring 140 is shown in FIG. 5C. The hub ring 140 includes an inner surface 142 and an outer winding surface 144. The inner surface 142 tapers in diameter from the opposing ends of the hub ring 140. Once again, however, the hub ring 140 is symmetrical in transverse cross-section. Therefore, the hub ring 140 uniformly distributes stress or force placed upon the outer winding surface 144. Importantly, regardless of the exact shape of the inner surface 142, the inner surface 142 defines a minimum radius that is sufficiently large for passage of the loop members 54 (FIG. 2) and the legs 94 (FIG. 2) within the hub ring 140.

Returning to FIG. 2, each of the upper flange 40, the lower flange 42 and the hub ring 44 are separately constructed. Thus, the upper flange 40, the lower flange 42, and the hub ring 44 can be molded from different materials specifically selected to accommodate the requirements of a particular tape system. Generally speaking, different tape systems will present different constraints in terms of storage tape tension, head wrap angles, and tape reel assembly modulus of elasticity and allowable creep. The materials selected to the components 40–44 can therefore be varied to satisfy these requirements. For example, the upper flange 40 can be polycarbonate, whereas the lower flange 42 and the hub ring are 20 percent glass filled polycarbonate or acetal. Alternatively, a wide variety of other acceptable materials may be employed. Even further, the components 40–44 can be formed from the same material. Notable, because the upper flange 40, the lower flange 42 and the hub ring 44 are independently manufactured, the molding process can be selected to achieve optimal characteristics for the respective part. For example, it is desirable that the top plate 50 and the bottom plate 90 by highly flat. Conversely, the outer winding surface 126 of the hub ring 44 is desirably round. By molding the components 40–44 individually, these preferred design parameters can be achieved, unlike prior art tape reel assemblies whereby the hub and at least one of the flanges are integrally formed.

Following molding, the upper flange 40, the lower flange 42 and the hub ring 44 are assembled. For example, the hub ring 44 is coaxially disposed over the shoulder 92 of the lower flange 42 such that the bosses 98 engage the corresponding lower notches (not shown) in the hub ring 44. This engagement limits possible rotation of the hub ring 44 relative to the lower flange 42. Notably, the legs 94 and the toothed sections 96 extend upwardly within an area defined by the inner surface 124 of the hub ring 44. The upper flange 40 is then assembled to the lower flange 42 such that the hub ring 44 is positioned between the top plate 50 and the bottom plate 90. More particularly, the upper flange 40 is directed toward the lower flange 42 such that the loop members 54 pass within the inner surface 124 of the hub ring 44, and engage a respective one of the legs 94. In one preferred embodiment, a snap-fit is achieved between the loop members 54 and the legs 94, respectively. For example, the head 106 associated with one of the legs 94 snaps over and engages the cross-member 74 of a corresponding one of the loop members 54. Notably, because the loop members 54 and the legs 94 are somewhat compliant and biased in opposite directions, any tolerance build-up in the upper flange 40 and/or the lower flange 42 is eliminated. Upon final assembly, the bosses 56 associated with the upper flange 40 engage the upper notches 128 in the hub ring 44, thereby limiting rotation of the hub ring 44 relative to the upper flange 40. It will be understood that following assembly, the tape reel assembly 14 can be orientated in any direction, such that the top plate 50 is below the bottom plate 90.

Figure 6A:
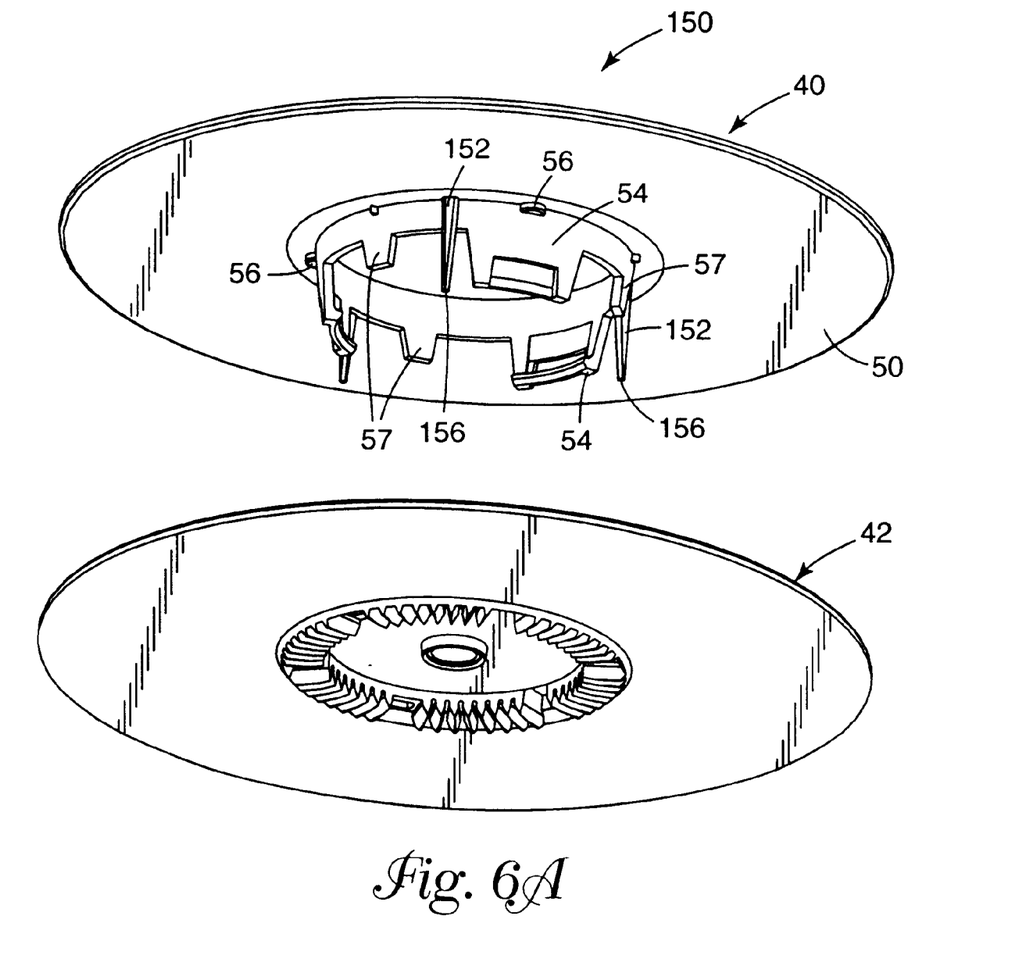
FIGS. 6A and 6B are exploded, perspective view of alternative tape reel assemblies in accordance with the present invention.
Figure 6B:
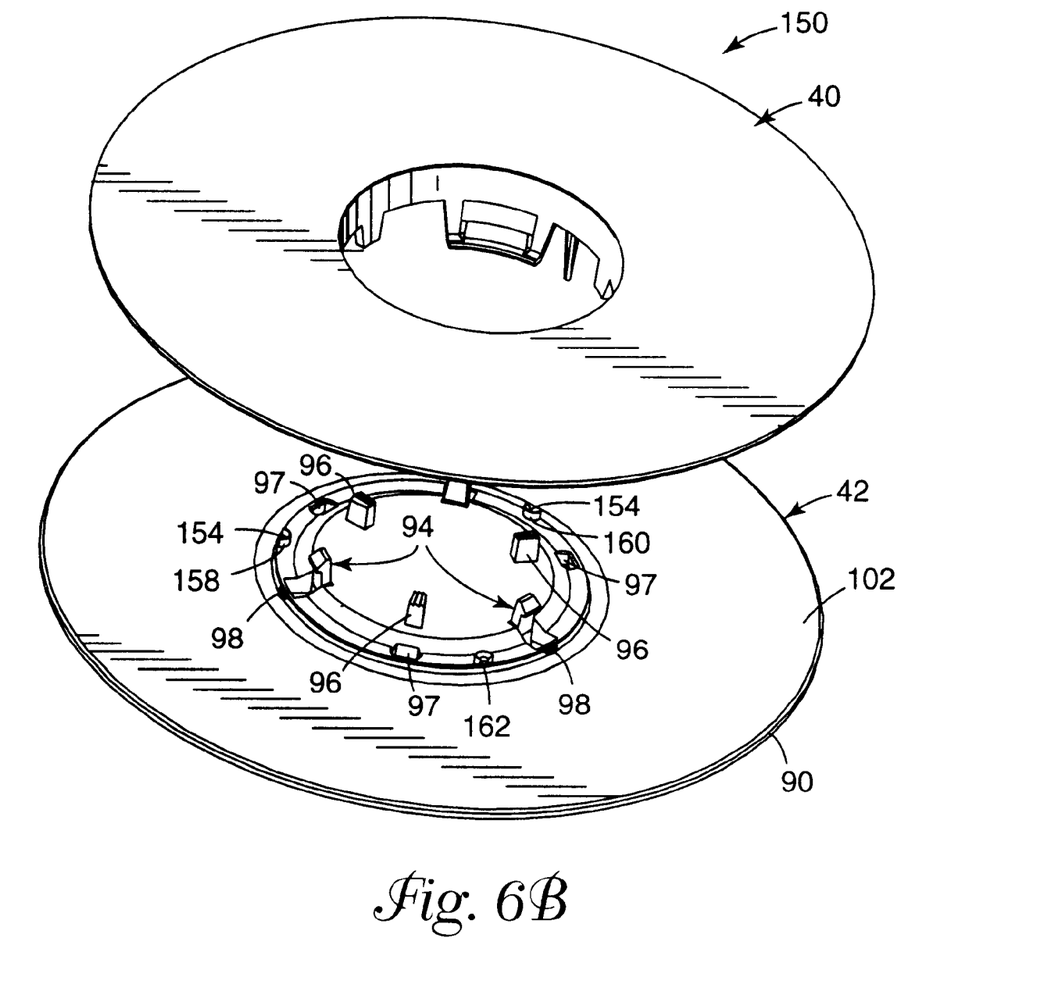

The above-described tap reel assembly 14 relies upon interaction of the upper and lower notches 128 of the hub ring 44 with the bosses 56, 98 associated with the upper and lower flanges 40, 42, respectively, to center the upper flange 40, the lower flange 42 and the hub ring 44. Alternatively, an additional centering assembly can be included to provide a more complete centering of the components 40–44. For example, FIGS. 6A and 6B depict an alternative tape reel assembly 150. As a point of reference, the tape reel assembly 150 is highly similar to the tape reel assembly 14 previously described with like components being similarly numbered. Further, for ease of illustration, the tape reel assembly 150 is shown in FIGS. 6A and 6B without the hub ring 44 (FIG. 2). With this in mind, the tape reel assembly 150 includes the upper flange 40, the lower flange 42 and the hub ring 44 (FIG. 2). The upper flange 40 includes the top plate 50, the loop members 54 and the bosses 56. The loop members 54 and the bosses 56 extend from the inner face 62 of the top plate 50 as previously described. Similarly, the lower flange 42 includes the bottom plate 90, the legs 94 and the bosses 98. As previously described, the legs 94 and the bosses 98 extend from and/or along the inner face 102 of the bottom plate 90.

In addition, the tape reel assembly 150 includes flexible posts 152 and receiving regions 154. The flexible posts 152 are integrally formed as part of the upper flange 40, whereas the receiving regions 154 are integrally formed as part of the lower flange 42.

In a preferred embodiment, and as best shown in FIG. 6A, the flexible posts 152 extend in a generally axial fashion from the inner face 62 of the top plate 50. In one preferred embodiment, three of the posts 152 are provided, with the posts 152 being equidistantly spaced. Alternatively, a greater or lesser number of the posts 152 may be included. Regardless, each of the posts 152 extend from the top plate 50 at a radius (relative to the center of the top plate 50) slightly greater than the radius R1 defined by the loop members 54.

Each of the posts 152 are configured to be flexible or deflectable, terminating at a leading end 156. This desired flexibility can be achieved by an appropriate material or by forming the posts 152 to be relatively thin. For example, in one preferred embodiment, each of the posts 152 is cylindrical, having a diameter or thickness in the range of 0.02–0.04 inch; more preferably 0.03 inch. Further, as previously described, the upper flange 40, and thus the posts 152, are preferably molded from a strong, yet relatively pliable, plastic material, such as polycarbonate. With this preferred configuration, the posts 152 will readily deflect in response to a radial force. For example, in one preferred embodiment, each of the posts 152 can radially deflect at least 0.005 inch.

As best shown in FIG. 6B, the receiving regions 154 are formed along the inner face 102 of the bottom plate 90. For example, in one preferred embodiment, the receiving regions 154 are each defined by a wall 158 extending in a generally axial fashion from the bottom plate 90. In one preferred embodiment, three of the receiving regions 154 are provided. Alternatively, however, any other number, either greater or smaller, is equally acceptable, so long as the number of the receiving regions 154 corresponds with the number of posts 152. The receiving regions 154 are positioned relative to a center of the bottom plate 90 so as to engage a respective one of the posts 152 upon final assembly. Thus, the receiving regions 154 are preferably equidistantly spaced, positioned at approximately the same radius as the posts 152.

In a preferred embodiment, the wall 158 associated with each of the receiving regions 154 is arcuate or semi-circular in shape. Further, the wall 158 defines an inner face 160 and an outer face 162. As shown in FIG. 6B, the outer face 162 tapers radially outwardly at an upper portion of the wall 158. This tapered configuration facilitates the wall 158 guiding the leading end 156 of the respective post 152 into the receiving region 154 during assembly. Finally, the receiving regions are each sized to be slightly larger than a width of the post 152. With this configuration, the posts 152 are maintained within the receiving regions 154, respectively by an interference fit.

Figure 7:
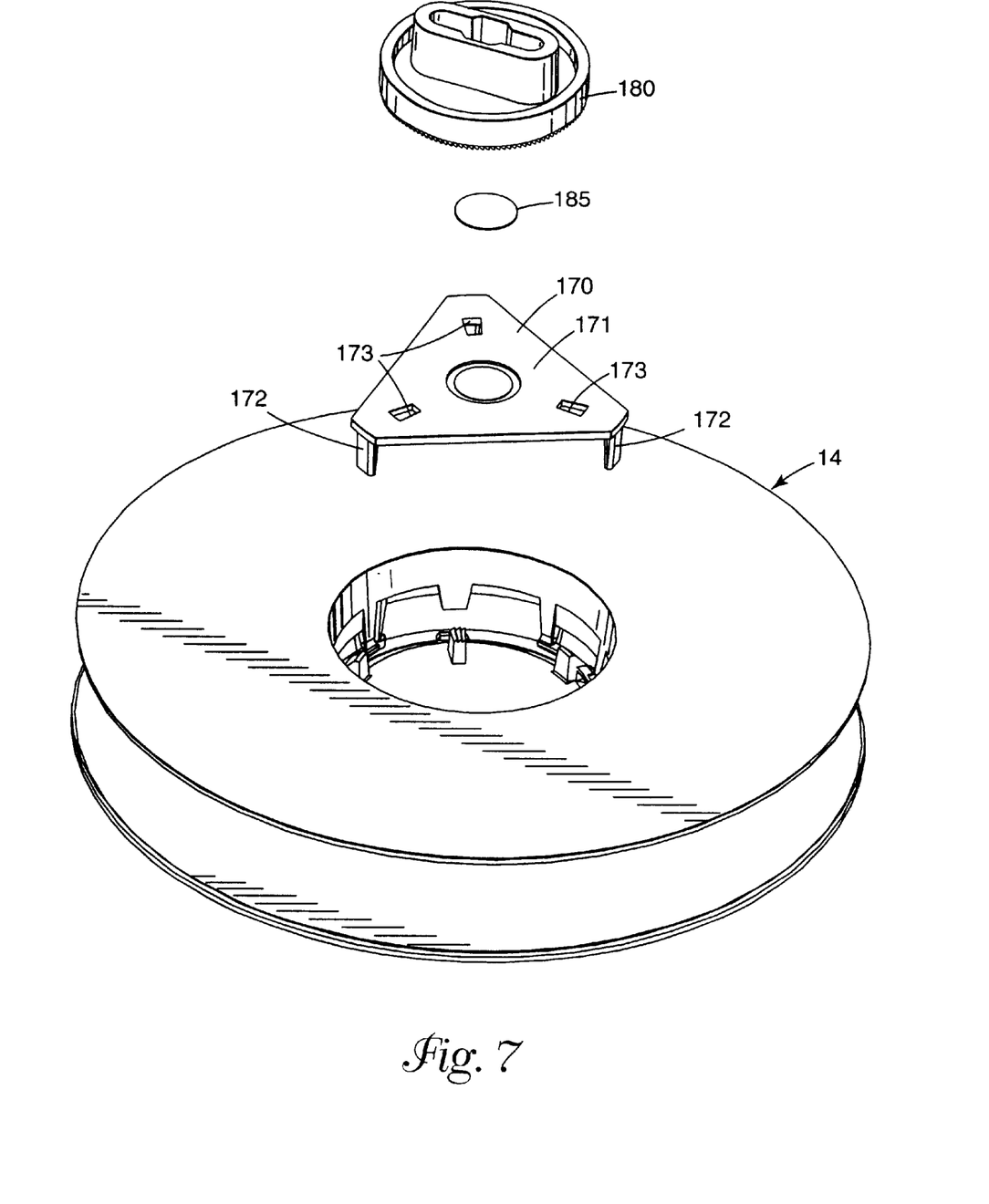
FIG. 7 is an exploded perspective view of the tape reel assembly shown in FIGS. 6A and 6B with an unlocking member.
Figure 8:
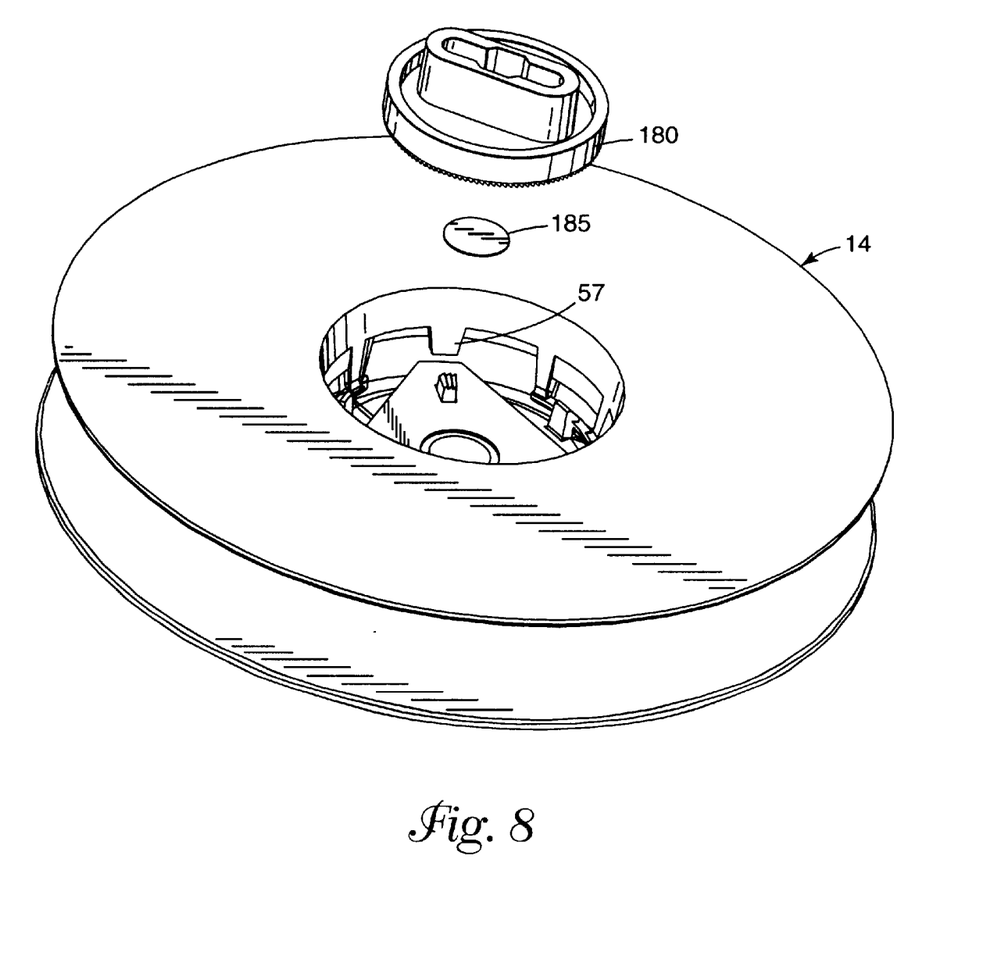
FIG. 8 is an exploded perspective view of the tape reel assembly of FIG. 7 with the unlocking member assembled in the tape reel assembly.

FIG. 7 shows the tape reel assembly 14 with the unlocking member 170, brake button 180 and a polyethylene film 185 exploded away from the tape reel assembly 14. The assembled version of the tape reel assembly with the unlocking member 170 in position is shown in FIG. 8. As will be discussed in more detail hereafter, the unlocking member 170 is a placed position before the flanges 40 and 42 and hub 44 are assembled.

The unlocking member 170 is generally triangular in shape and is constructed from a suitable material such as a glass fiber or carbon fiber filled polycarbonate. The unlocking member 170 needs to be constructed from a material which resists creep. The material for the unlocking member, at 150° F., will preferably have a dimensionally resistance to creep of 10 percent or less and preferably 5 percent or less. However, such material tends to have poor wear characteristics. The unlocking member 170 has a triangular planar member 171 with three downwardly depending legs 172, as viewed in FIG. 7. Three generally rectangular openings 173 are formed in the planar member 171. The unlocking member 170 is used with the tape reel assembly as shown in FIGS. 6A and 6B. As it is more clearly seen in FIGS. 6B and 8, the unlocking member 170 is placed in position such that the openings 173 fit over the tooth sections 96 and the legs 172 extend into the openings 97 which extend through the flange 42. Protrusions 57 extend from the flange 40 in the same direction as the loop members 54, but do not extend as far. As shown in FIG. 8, the protrusions 57 do not extend all the way to the planar member 171. However, they do extend sufficiently far so that the planar member 171 will contact the protrusions 57 before the planar member 171 is free from the tooth sections 196. Therefore, the unlocking member 170 is in a floating position on the tape reel assembly 14.

Figure 9:
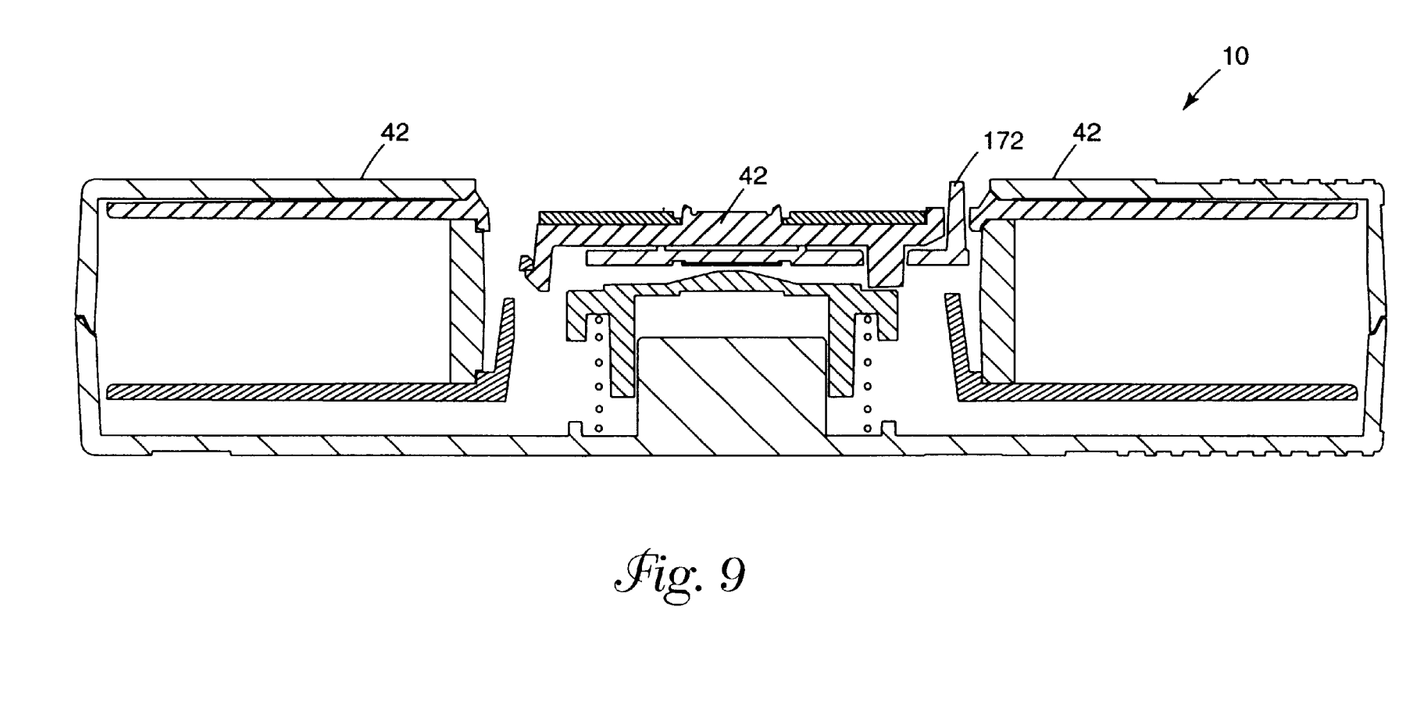
FIG. 9 is a cross-sectional view of the data storage cartridge of FIG. 1 in an in-hand position.
Figure 10:
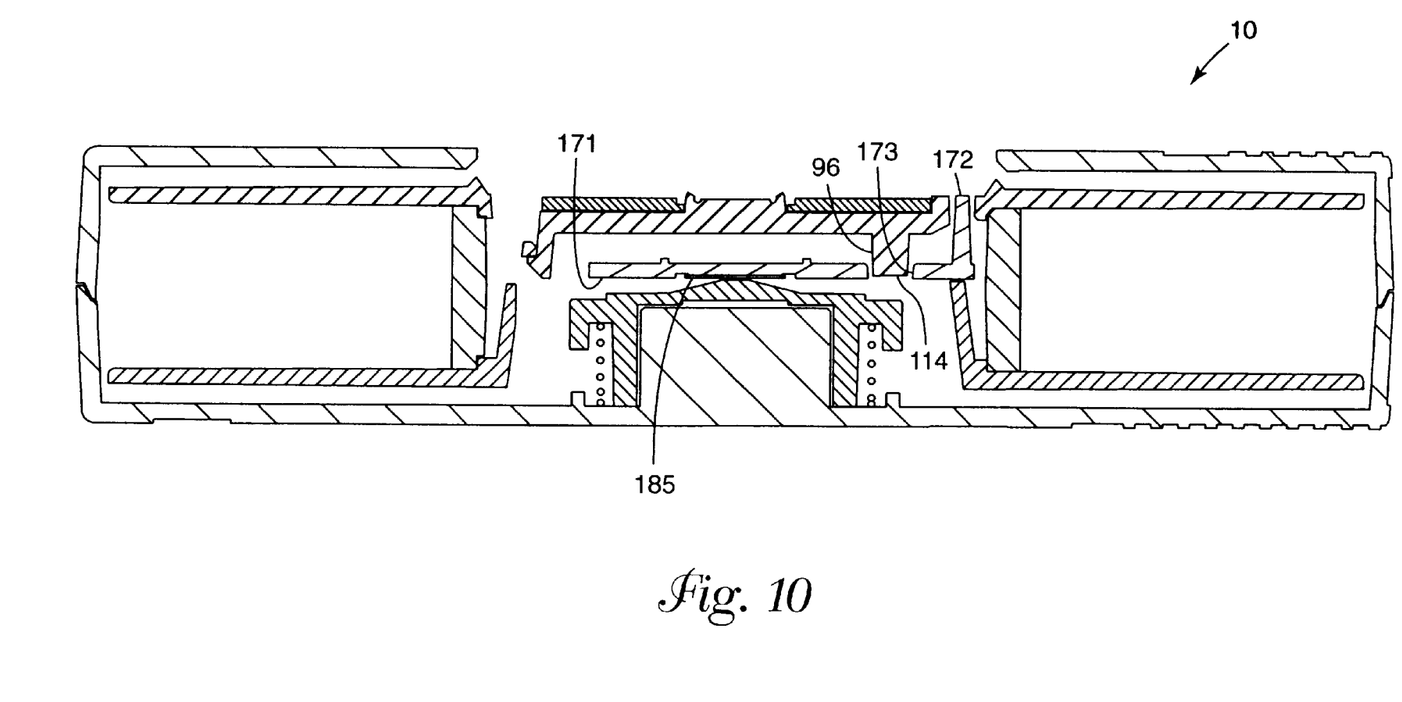
FIG. 10 is a cross-sectional view of the data storage tape cartridge as shown in FIG. 1, in a drive position.

The brake button 180 is sized and configured to fit within the central passage 58. The brake button 180 consists of a disc 181 around the circumference of which are formed a plurality of teeth 182. The teeth 182 are sized and configured to form a locking surface with the teeth 114 of the tooth section 96. A rectangular base 183 having a slot 183a formed therein is operatively connected to the disc 181. Preferably, the brake button 180 is formed with an integral part and is formed from a suitable material such as 66 nylon molyidiumsulfite, although it is understood that other suitable materials may also be utilized. The slot 183a is sized and configured to fit over the mounting flange 31 which is operatively connected to the section 22. When the button 180 is positioned on the mounting flange 31, the button 180 cannot rotate. A conical section 184 is formed in the disc 181 and provides for a surface which is in contact with the unlocking member 170. As shown in FIGS. 9 and 10, a spring 187 is positioned between the section 22 and the disc 181, thereby providing a biasing force away from the section 22. The spring urges the button towards the unlocking member 170 and, as shown in FIG. 9, it is in an "in-hand" position. The spring forces the unlocking member 170 up against the flange 42. The teeth 182 then come in contact and engage the tooth sections 96 and prevent rotation of the tape reel assembly 14. In this position, the legs 172 extend outward past the flange 42.

FIG. 10 shows the cartridge in an "in-drive" position. Here, the drive (not shown) has engaged and pushed on the legs 172 forcing the unlocking member 170 downward, as viewed in FIG. 10. This causes the brake button 180 to move downward and disengages the teeth 182 from the tooth sections 96, thereby allowing the tape reel assembly 14 to rotate as the drive rotates. This in turn allows the tape on the tape reel assembly to be wound or unwound.

The unlocking member 170 must not only be rigid enough to unlock the tape reel 14 when in a drive, it must not exhibit any material creeping characteristics. In addition, it must also provide a surface that will not wear when spinning against the brake button 180. The wear surface on the unlocking member 170 is provided by a polyethylene film 185 which is secured to the planar member 171 by means of an adhesive, such as an acrylic adhesive, rubber adhesive or other suitable adhesives. The polyethylene film 185 is preferably circular in shape and, as seen in FIGS. 9 and 10, is sized to be in contact with the conical section 184. Therefore, as shown in FIG. 10, which is the in-drive position where the tape reel assembly 14 would be spinning, the unlocking member 170 has enough rigidity to unlock the tape reel assembly and still provides a wearing surface, provided by the polyethylene film 185, against the brake button 180.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A data storage cartridge comprising:

a) a housing defining an enclosure;

b) a tape reel assembly rotatably mounted in the housing;

c) a brake member operatively connected to the housing;

d) an unlocking member operatively connected to the tape reel assembly and moveable between a locked position and an unlocked position; wherein when in the unlocked position, the unlocking member moves the brake member away from the tape reel, thereby allowing the tape reel to rotate;

e) the unlocking member constructed from a filled polycarbonate; and f) a wear member operatively connected to the unlocking member forming a wear surface at a position which contacts the brake member when in the unlocked position, the wear member being a polyethylene planar disk film.

2. The data storage cartridge of claim 1, wherein the filled polycarbonate is a glass filled polycarbonate.

3. The data storage cartridge of claim 1, wherein the film is attached with an adhesive.

4. A data storage cartridge comprising:

a) a housing defining an enclosure;

b) a tape reel assembly rotatably mounted in the housing;

c) a brake member operatively connected to the housing;

d) an unlocking member operatively connected to the tape reel assembly and moveable between a locked position and an unlocked position; wherein when in the unlocked position, the unlocking member moves the brake member away from the tape reel, thereby allowing the tape reel to rotate;

e) the unlocking member constructed from a glass filled polycarbonate; and f) a flat polyethylene film attached by an adhesive to the unlocking member forming a wear surface at a position which contacts the brake member when in the unlocked position.

5. A data storage cartridge comprising:
a) a housing defining an enclosure;
b) a tape reel assembly rotatably mounted in the housing;
c) a brake member operatively connected to the housing;
d) an unlocking member operatively connected to the tape reel assembly and moveable between a locked position and an unlocked position; wherein when in the unlocked position, the unlocking member moves the brake member away from the tape reel, thereby allowing the tape reel to rotate;
e) the unlocking member constructed from a plastic that is resistant to creep and has a given wear characteristic;
f) a wear member constructed from a plastic having wear characteristics better than the locking member; and
g) the wear member attached to the unlocking member to form a wear surface at a position which contacts the brake member when in the unlocked position, the wear member being a flat member.

6. The data storage cartridge of claim 5, wherein the unlocking member is constructed from a filled polycarbonate.

7. The data storage cartridge of claim 6, wherein the plastic is a glass filled polycarbonate.

8. The data storage cartridge of claim 7, wherein the wear member is a polyethylene planar disk film.

9. The data storage cartridge of claim 8, wherein the film is attached with an adhesive.

* * * * *